(No Model.) 2 Sheets—Sheet 1.
J. MORNINGSTAR.
THRASHING MACHINE.
No. 548,577. Patented Oct. 22, 1895.
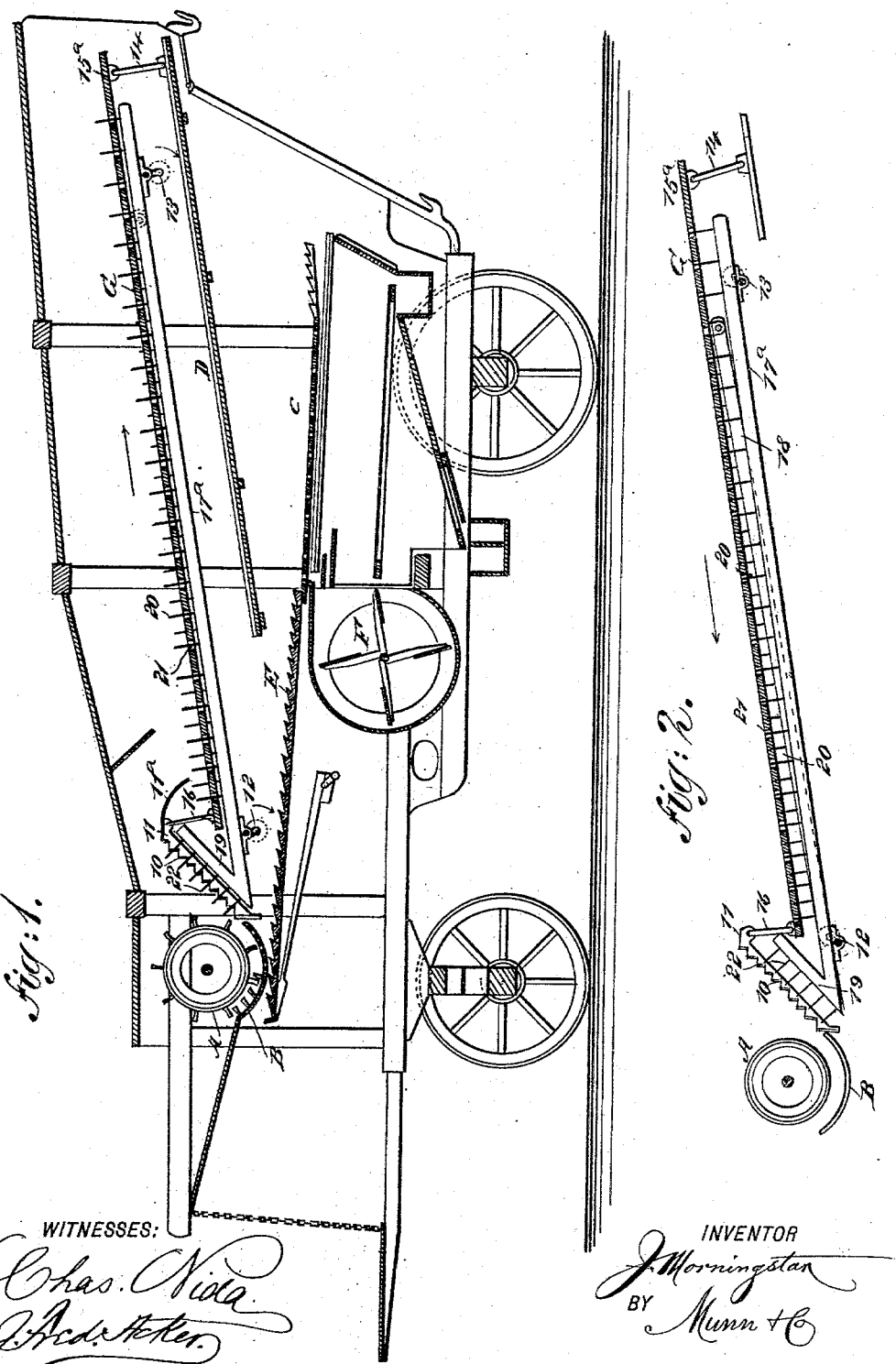

(No Model.) 2 Sheets—Sheet 2.
J. MORNINGSTAR.
THRASHING MACHINE.
No. 548,577. Patented Oct. 22, 1895.
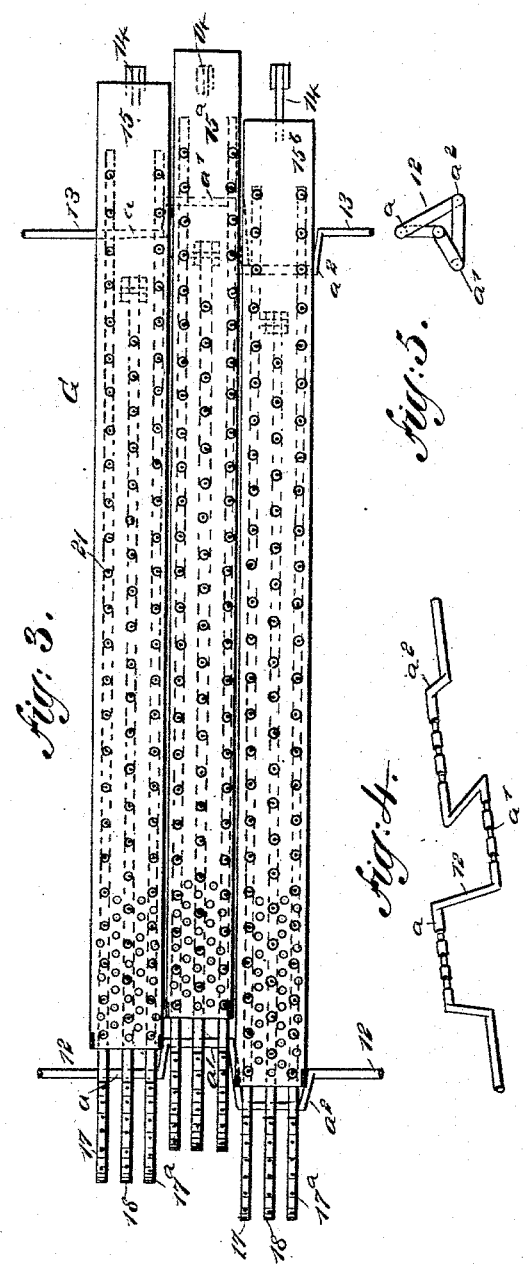
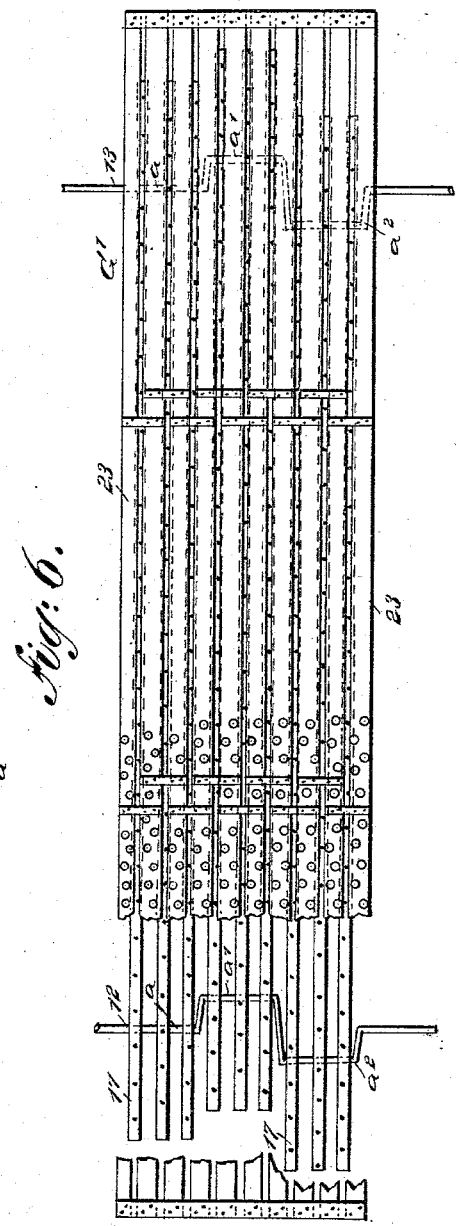
WITNESSES:
INVENTOR
J Morningstar
BY Munn & Co
ATTORNEYS.

UNITED STATES PATENT OFFICE.

JESSE MORNINGSTAR, OF PETTISVILLE, OHIO.

THRASHING-MACHINE.

SPECIFICATION forming part of Letters Patent No. 548,577, dated October 22, 1895.

Application filed February 11, 1895. Serial No. 537,940. (No model.)

*To all whom it may concern:*

Be it known that I, JESSE MORNINGSTAR, of Pettisville, in the county of Fulton and State of Ohio, have invented a new and useful Improvement in Thrashing-Machines, of which the following is a full, clear, and exact description.

My invention relates to an improvement in thrashing-machines; and it has for its object to provide a simple and effective means whereby the straw and grain adhering thereto will be fed from the cylinder or concave to a reciprocating floor, in connection with which a series of rakes will be operated, the rakes having substantially parallel movement with the floor in both directions. When, however, the rakes move in a direction to feed the straw, the teeth of the rakes will be above the upper surface of the floor, but when the rakes move in direction to receive the straw the teeth will be practically withdrawn from the floor and its upper surface will be free, or that portion of the surface through which the teeth of the rake so moving pass.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a longitudinal vertical section through a thrashing-machine having the improvement applied thereto, the section being likewise taken through the floor, showing one of the rakes at its rearward throw, the said rake being in side elevation. Fig. 2 is a longitudinal sectional view through the floor, illustrating as upon its forward throw the rake shown in Fig. 1 upon its rearward throw. Fig. 3 is a plan view of the floor, the rakes, and the shafts carrying the same. Fig. 4 is a perspective view of one of the crank-shafts carrying the rakes. Fig. 5 is an end view of the said shaft; and Fig. 6 is a plan view of the floor and rakes, parts of both being broken away, and illustrates the adaptation of the rakes to a stationary floor.

The thrasher is provided with the usual cylinder A, concave B, finishing-riddle C, conducting-board D, leading to the finishing-riddle, the lower shaker-floor E, and fan F.

In carrying out the invention a series of stepped bars 10 is rigidly secured in any approved manner within the forward portion of the thrasher, forming an upward and rearward continuation of the concave, the said stepped bars being spaced a suitable distance apart, and each bar at its upper end is provided with a rearwardly-extending flange 11, and a downwardly and rearwardly curved hood $11^a$ is secured upon the said flanges, being adapted to conduct the straw carried by the stepped surface to the separating-floor, to be hereinafter described.

Beneath and at the rear of the series of stepped bars 10 a crank-shaft 12 is journaled in the casing of the machine, extending from side to side thereof, and near the rear of the casing, but upon a higher plane, a corresponding crank-shaft 13 is journaled in suitable bearings. Each crank-shaft is provided with the same number of crank-arms, and the crank-arms are arranged at different angles to the longitudinal axis of the shaft, and consequently at angles to one another. In the drawings three crank-arms are formed in each shaft, such being the preferred number, and they are designated, respectively, as $a$, $a'$, and $a^2$.

Ordinarily upon the upper end of the conducting-floor D or upon any fixed support near the outlet of the machine a series of rocker-arms 14 are located, each rocker-arm being pivoted at its lower end, and the rocker-arms correspond in number to the number of crank-arms upon a rocker-shaft and are located one preferably behind the central portion of each arm of the rear crank-shaft, as shown in Figs. 1 and 3. The upper end of each rocker-arm is pivotally connected to a section of a separating-floor G. Consequently under the construction shown the floor comprises three sections 15, $15^a$, and $15^b$. The forward end of each floor-section is supported by a rocker-arm 16, the said arms being preferably pivotally connected with the flanges 11 of the most conveniently-situated stepped bars 10. Beneath each floor-section preferably three rake-bars 17, 18, and $17^a$ are located, the bar 18 being the central one of the three. Each series of bars at the receiving end of the machine is pivoted upon one crank-arm, and the said bars at their forward ends are provided with upwardly and rearwardly inclined extensions 19, adapted to move substantially parallel with the rear of the stepped bars 10, as shown in Figs. 1 and 2. The outer rake-bars 17 and 17ª of each series are pivotally connected with a crank-arm on the rear crank-shaft 13, corresponding to the crank-arm on the forward shaft 12, upon which said bars are pivoted.

The central rake-bar 18 is virtually a pitman-bar, since at its rear end the central rake-bar of each series of rake-bars is pivotally connected with the bottom of the floor-section located above it, the attachment being forward of the rear crank-shaft 13. Consequently the floor-sections will follow the rake-bars with which they are connected, and since the floor-sections have simply a laterally-reciprocating movement and the rake-bars have a certain amount of throw, owing to the said pitman connection between the crank-arms and the floor-sections, the rake-bars in their forward throw will move parallel with and close to the floor-sections located above them, and in the forward throw of corresponding floor-sections and rake-bars the rake-bars will yet move parallel with the floor-sections, but will drop at the same time considerably below them, while the central or pitman rake-bars will assume a position at an angle to the floor-sections, and owing to the relation of the crank-arms to one another one floor-section and its connecting rake-bars will be on the forward throw while the other will be on the point of making its return-throw and the third will have just completed the said return-throw.

Each rake-bar is provided with teeth 20 along the upper face of the body of the bars, and the floor-sections are provided with apertures 21, adapted to receive these teeth, and teeth 22 are located upon the forward extensions of the rake-bars and operate in the spaces between the stepped bars.

The teeth of the outer rake-bars of a series are of such length that when the rake-bars are on their return or forward throw said teeth will be below the plane of the upper face of the floor-section over said bars, leaving the said face of the floor-section perfectly smooth. Therefore there is nothing to retard the rearward movement of the straw, and it is evident that, owing to the necessary inclined position of the central or pitman rake-bars with relation to the floor-sections, the teeth on the body of these bars must be graduated in length, the shorter teeth being at the end connected with the floor-sections. The teeth of the other bars correspond throughout in length to the length of the throw of the cranks.

From the foregoing description it will be observed that the relation between the sectional separating-floor and the series of rake-bars is such that when the sections of the floor and bars move in direction of the cylinder the rake-teeth will be withdrawn from the upper face of the floor-sections and that upon the movement of the bars and floor-sections in direction of the rear end of the machine the rake-teeth will be projected beyond the upper face of the floor and feed the straw out at the rear end of the machine.

In Fig. 6 I have illustrated a slight modification, in which a stationary separating-floor G' is employed, said floor being made up of a series of strips 23, suitably connected, and all of the rake-bars are pivotally connected with the crank-arms of the two crank-shafts, the pitman-bar being omitted, and the rake-bars are so placed that their teeth will at the rearward feed of the bars extend upward through the spaces between the slats of the floor.

Having thus described my invention, I claim as new and desire to secure by Letters Patent—

1. In a thrashing machine, a separating floor, rocker arms supporting the floor, whereby it may be longitudinally reciprocated, the said floor being provided with series of openings, crank shafts journaled below the floor, a series of rake bars pivoted upon the crank arms of one crank shaft, the said bars being pivoted likewise upon the corresponding arms of the opposing shaft, and a pitman rake bar pivotally connected with the floor and with the said crank arm of one of the said shafts only, as and for the purpose specified.

2. In a thrashing machine, the combination, with a separating floor and crank shafts journaled below the same, of rake bars pivotally attached to corresponding crank arms of the said crank shafts, and a pitman bar pivoted to the same crank arm of one shaft, and pivotally attached at its opposite end to the said floor, as and for the purpose specified.

3. In a thrashing machine, the combination with a separating floor and crank shafts journaled below the same, of rake bars pivotally attached to corresponding crank arms of the said crank shafts, toothed extensions projecting upwardly and rearwardly from the forward ends of the rake bars, and stepped bars adapted to be located adjacent to the concave of the machine and receiving between them the teeth of the extensions, as and for the purpose set forth.

4. In a thrashing machine, the combination, with a separating floor constructed in sections, each section being provided with an independent rocking support, whereby the sections may have longitudinally reciprocating movement, of crank shafts journaled beneath the floor sections, each shaft being provided with a corresponding number and correspondingly located crank arms, the crank arms being at angles to one another, rake bars pivotally connected with corresponding crank arms on the said crank shafts, and a pitman rake bar journaled between the ordinary rake bars on each crank arm of one shaft, the said pitman rake bars being attached at their opposite ends one to each floor section, substantially as shown and described.

5. In a thrashing machine, the combination, with a separating floor constructed in sections, each section being provided with an independent rocking support, whereby the sections may have longitudinally reciprocating movement, of crank shafts journaled beneath the floor sections, each shaft being provided with a corresponding number and correspondingly located crank arms, the crank arms being at angles to one another, rake bars pivotally connected with corresponding crank arms on the said crank shafts, and a pitman rake bar journaled between the ordinary rake bars on each crank arm of one shaft, the said pitman rake bars being attached at their opposite ends one to each floor section, toothed extensions rearwardly and upwardly projected from the forward ends of the said rake bars, and stepped bars adapted to be located adjacent to the concave of the machine, receiving between them the teeth of the extensions, sections of the separating floor reciprocating over the body portion of the rake bars only, as and for the purpose specified.

JESSE MORNINGSTAR.

Witnesses:
GEORGE H. PRICHARD,
THOMAS A. KELLY.